No. 888,486. PATENTED MAY 26, 1908.
R. K. GREGORY.
NUT LOCK.
APPLICATION FILED SEPT. 24, 1907.
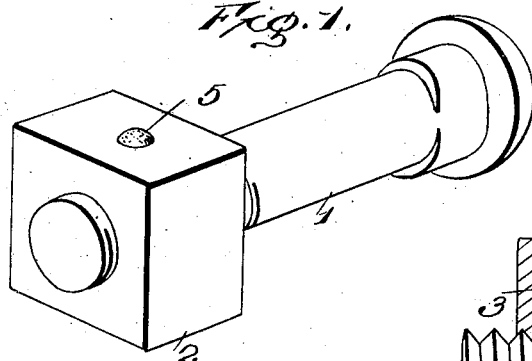
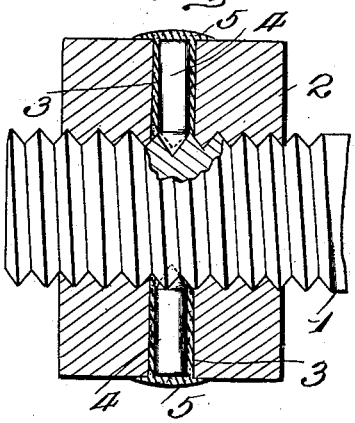
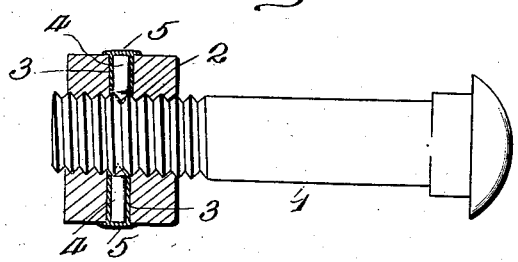
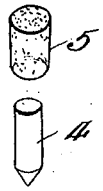
Witnesses
Inventor
R. K. Gregory
By
Attorneys

UNITED STATES PATENT OFFICE.

RICHARD K. GREGORY, OF GREENSBORO, NORTH CAROLINA, ASSIGNOR OF ONE-HALF TO JOHN H. WHITE, OF BALTIMORE, MARYLAND.

NUT-LOCK.

No. 888,486.      Specification of Letters Patent.      Patented May 26, 1908.

Application filed September 24, 1907. Serial No. 394,381.

*To all whom it may concern:*

Be it known that I, RICHARD K. GREGORY, citizen of the United States, residing at Greensboro, in the county of Guilford and State of North Carolina, have invented certain new and useful Improvements in Nut-Locks, of which the following is a specification.

This invention has for its object a simple and efficient nut-lock that may be very cheaply made and easily applied, the invention being applicable to any form of bolt and nut without the necessity of any change in the construction of the bolt and with no material changes in the nut, the nut being merely provided with one or more openings extending therethrough at right angles to the axis of the bolt to receive the locking pin, such opening or openings being easily formed by boring or drilling through the nut or by forming the nut with the opening in the manufacture.

The invention consists in certain constructions and arrangements of the parts that I shall hereinafter fully describe and claim.

For a full understanding of the invention, reference is to be had to the following description and accompanying drawing, in which:

Figure 1 is a perspective view of a bolt and nut thereon, indicating the latter applied with my improved locking pin; Fig. 2 is a sectional view of the nut lock, the bolt being shown in side elevation; Fig. 3 is a similar view, on an enlarged scale, of the threaded portion of the bolt, a part thereof being broken away; and, Fig. 4 is a detail sectional view of the pin employed to lock the nut, its soft metal jacket being shown slightly separated from the pin.

Corresponding and like parts are referred to in the following description and indicated in all the views of the drawings by the same reference characters.

Referring to the drawing, the numeral 1 designates a bolt of any desired design or construction, and 2 designates a nut screwing on the threaded end of the bolt, said nut being of any desired construction or design, except as hereinafter set forth, and being initially or otherwise formed in any one or more of its sides with one or more openings 3 extending entirely therethrough at right angles to the axis of the bolt.

A pin 4 is designed to be driven into the opening 3 against the threads of the bolt in order to securely lock the nut to the bolt, and said pin is preferably formed of hard steel and embodies a cylindrical body portion and a tapered or pointed end. A jacket 5 incases the locking pin 4, said jacket being composed of relatively soft metal and extending around the body portion and over the upper end of the pin as clearly illustrated in the drawing.

In the practical use or application of my improved nut-lock, the locking pin with its soft metal jacket is driven into the opening 3 solidly against the thread of the bolt, the soft metal jacket being mashed into the opening so as to spread over the outer end thereof to form a protuberance of beadlike form, and serving to effectually and permanently hold the pin in place.

From the foregoing description in connection with the accompanying drawing, it will be seen that I have provided a very simple nut-lock that may be cheaply constructed and readily applied wherever it is desired to prevent the accidental unscrewing of a nut, it being only necessary to form one or more of the openings 3 in the nut and to perform the operation of driving the pin 4 with the soft metal jacket into the opening, such operation being susceptible to easy and quick accomplishment.

Having thus described the invention, what is claimed as new is:

The herein described nut-lock comprising, in combination with a nut formed with an opening extending therethrough at right angles with the longitudinal axis of the bore of the nut, a locking pin designed to be driven in said opening, and a jacket of relatively soft metal incasing said pin and designed to be mashed over the opening in the nut whereby to securely hold the pin in place.

In testimony whereof I affix my signature in presence of two witnesses.

RICHARD K. GREGORY. [L. S.]

Witnesses:
    W. N. WOODSON,
    FREDERICK S. STITT.